United States Patent [19]

Moores et al.

[11] Patent Number: 4,776,092
[45] Date of Patent: Oct. 11, 1988

[54] PEELER ATTACHMENT FOR ELECTRIC KNIFE

[75] Inventors: Gregory E. Moores, Oxford; Joseph J. Kopp, Jr., West Haven, both of Conn.

[73] Assignee: Black & Decker, Inc., Newark, Del.

[21] Appl. No.: 29,147

[22] Filed: Mar. 23, 1987

[51] Int. Cl.$^4$ ............................................. B26B 7/00
[52] U.S. Cl. ................................ 30/123.5; 30/272 A; 30/279 R
[58] Field of Search .............. 30/123.5, 123.6, 123.7, 30/272 A, 279 R, 279 A

[56] References Cited

U.S. PATENT DOCUMENTS 3,555,678  1/1971  Agulnick et al. ................ 30/272 A

FOREIGN PATENT DOCUMENTS 2402433  5/1979  France ........................... 30/279 R Primary Examiner—Douglas D. Watts
Attorney, Agent, or Firm—Paul J. Lerner

[57] ABSTRACT

A peeler attachment for an electric appliance includes a frame having a central slot therein and a blade disposed centrally of the slot. The blade includes first and second cutting edges at opposed sides thereof. The cutting edges are spaced from the central slot to form first and second entry channels into the slot. The blade includes first and second surfaces facing the slot shaped to provide continuously increasing exit channels whereby any tendency for peelings to become wedged in the exit channels is avoided. A shank for locking the peeler attachment into the electric appliance is preferably unitary with the blade. First and second locking notches in the shank permit installation of the peeler attachment in first and second rotational positions angularly separated by 180 degrees, whereby both right-handed and left-handed user are accommodated.

2 Claims, 5 Drawing Sheets

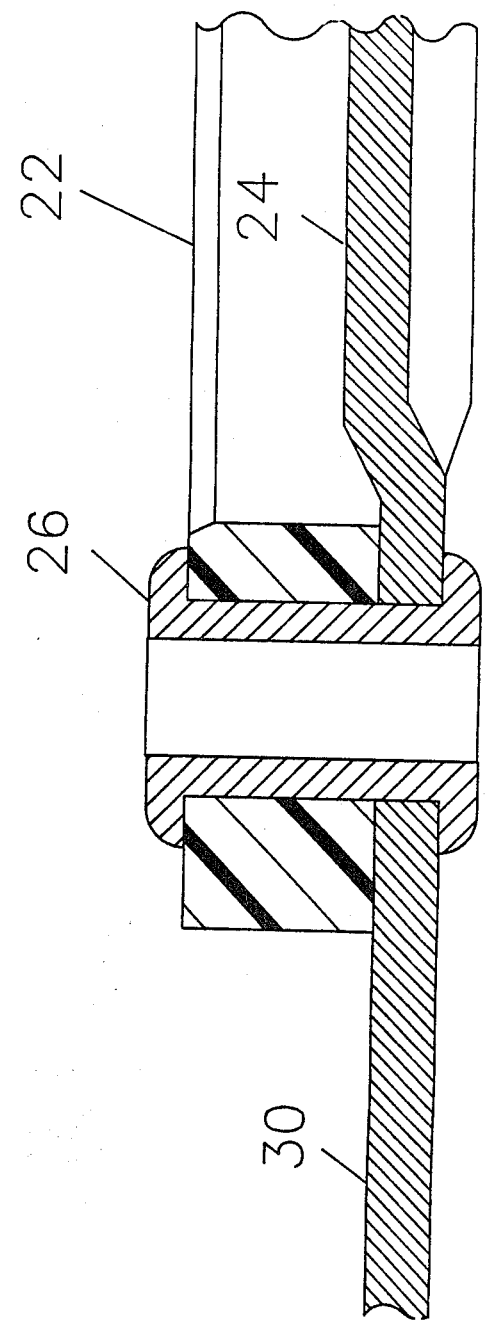

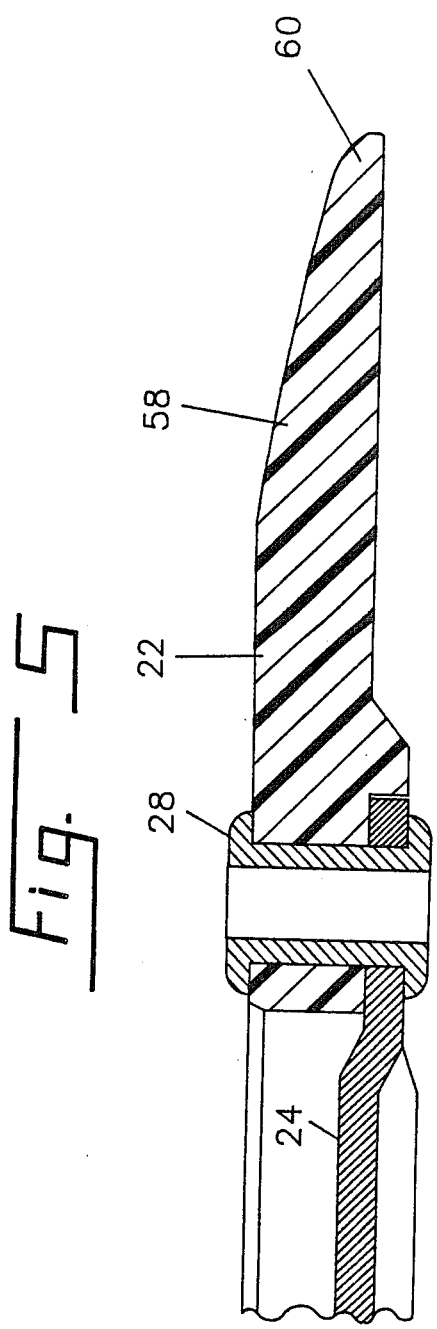

PEELER ATTACHMENT FOR ELECTRIC KNIFE

BACKGROUND OF THE INVENTION

The present invention relates to cutting and peeling devices.

Peeling devices are used for removing a rind or peel from fruits and vegetable with as little loss as possible of the flesh of the fruit or vegetable. Classically, a paring knife is used for removing the rind or peel. It is well known that it is difficult to control the depth to which a paring knife cuts in removing a rind or peel. As a consequence, paring knives are less than ideal for this purpose.

A further type of peeling device employs a metal blade having a slot down its center. The inner edges of the slot are sharpened to produce a pair of cutting edges facing each other across the slot. The blade is customarily affixed in a handle in a manner permitting rotation of the blade about its longitudinal axis. The width of the slot, as well as a constraint on the rotation of the blade, limit the depth of cut which such a peeling device may execute. As a consequence, this type of peeling device sacrifices less of the flesh of the fruit or vegetable than does a paring knife in the hands of an average user. In addition, the geometry of the pair of cutting edges is such that the risk of cutting a user's hands is less than with a paring knife.

The present invention is especially directed toward a peeling device adapted for use with an electric appliance effective for reciprocating the peeling device along a longitudinal axis thereof. A knife blade may be employed in such a devce, but the problem of excessive cutting depth remains unchanged. A slotted peeling device of the type described above is unsuitable for use in a reciprocating environment.

OBJECTS AND SUMMARY OF THE INVENTION

Accordingly, it is an object of the invention to provide a peeler which overcomes the drawbacks of the prior art.

It is a further object of the invention to provide a peeler adapted for use in an electrical appliance effective for imparting a reciprocating motion to the peeler.

It is a still further object of the invention to provide a peeler adapted for both left-handed and right-handed users.

It is a still further object of the invention to provide a peeler attachment for an electric appliance wherein a cross section of a passage for peelings expands in a continuous manner downstream of a cutting edge.

It is a still further object of the invention to provide a peeler attachment for an electric appliance wherein a metallic clamping portion for clamping into the electric appliance is integrally formed with a cutting blade.

Briefly stated, the present invention provides a peeler attachment for an electric appliance including a frame having a central slot therein and a blade disposed centrally of the slot. The blade includes first and second cutting edges at opposed sides thereof. The cutting edges are spaced from the central slot to form first and second entry channels into the slot. The blade includes first and second surfaces facing the slot shaped to provide continuously increasing exit channels whereby any tendency for peelings to become wedged in the exit channels is avoided. A shank for locking the peeler attachment into the electric appliance is preferably unitary with the blade. First and second locking notches in the shank permit installation of the peeler attachment in first and second rotational positions angularly separated by 180 degrees, whereby both right-handed and left-handed users are accommodated.

According to an embodiment of the invention, there is provided a peeler attachment for an appliance comprising: a frame, a slot in the frame, a metallic blade affixed to the frame, the metallic blade including a shaped surface at least partly entering the slot, first and second sharpened edges on the metallic blade, the first and second sharpened edges being spaced from the frame to form first and second entry channels into the slot, the slot having a shape forming, with the shaped surface first and second exit channels contiguous with the first and second entry channels, respectively, the first entry channel and the first exit channel having a continuously increasing cross section, the second entry channel and the second exit channel forming a continuously increasing cross section, whereby a tendency for material to become wedged in the peeler attacheent is avoided, and means for attaching the peeler attachment to the appliance.

According to a feature of the invention, there is provided a peeler attachment for an electric knife comprising: a frame, a slot in the frame, a metallic blade affixed to the frame, a metallic shank extending from a first end of the peeler attachment, the metallic blade and the metallic shank being formed of a single piece of metal, the metallic shank including means for attaching the peeler attachment to the electric knife, the metallic blade including a shaped surface at least partly entering the slot, first and second sharpened edges on the metallic blade, the first and second sharpened edges being spaced from the frame to form first and second entry channels into the slot, the slot having a shape forming, with the shaped surface first and second exit channels contiguous with the first and second entry channels, respectively, the first entry channel and the first exit channel having a continuously increasing cross section, the second entry channel and the second exit channel forming a continuously increasing cross section, whereby a tendency for material to become wedged in the peeler attachment is avoided, and a nose on a second end of the frame, the nose having a point useable for digging out a portion of a fruit or vegetable.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 is a cross section taken along IV—IV in FIG. 2.

FIG. 5 is a cross section taken along V—V in FIG. 2.

DETAILED DESCRIPTION OF THE PREFERRED EMBODIMENT

Figure 1:
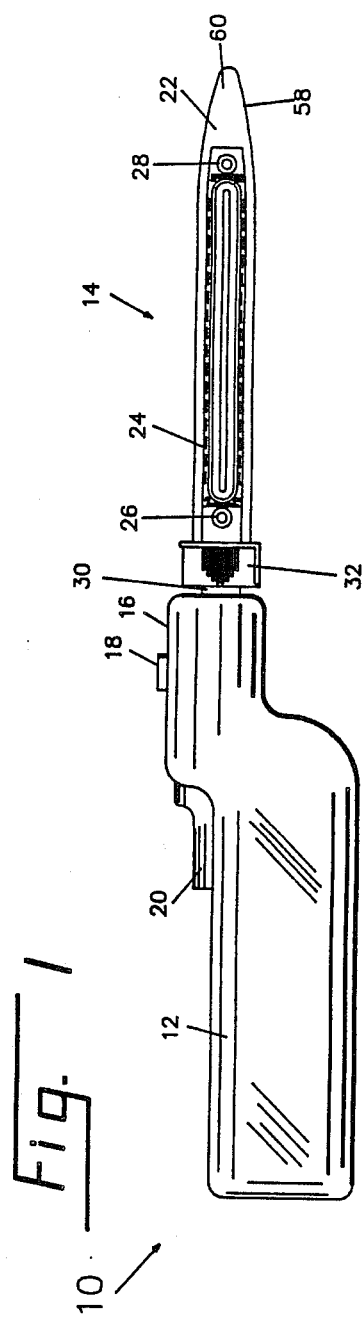
FIG. 1 is a side view of an electric knife having attached thereto a peeler according to and embodiment of invention.

Referring first to FIG. 1, there is shown, generally at 10, an electric knife having a handle 12 which may contain a conventional electric motor and a self-contained power source such as, for example, batteries (neither of which are shown). A peeler attachment 14 is affixed in a clamping portion 16. An attachment release button 18 permits release of peeler attachment 14 for insertion or removal thereof. An electric switch 20 controls application of electric power to an internal motor (not shown) for controlling reciprocation of peeler attachment 14 along its longitudinal axis. The apparatus for producing reciprocation of peeler attachment 14 is conventional and need not be further described. The manner in which peeler attachment 14 is clamped into clamping portion 16, and the interlock of a clamping means with electric switch 20 is described in U.S. Patent Application Ser. No. (029,147) filed on Feb. 23, 1987, and commonly assigned with the present application. The disclosure of this referenced patent application is incorporated herein for non-essential material.

Peeler attachment 14 includes a peeler frame 22 affixed to a blade 24 by any convenient means such as, for example, grommets 26 and 28. A blade shank 30 passes into clamping portion 16 for locking therein, as will be explained. In the preferred embodiment, blade shank 30 is integrally formed with blade 24. A grip 32 is affixed over blade shank 30 to provide a convenient place to grasp peeler attachment 14 for insertion in and removal from electric knife 10. Grip 32, may consist of two pieces mated from opposite sides of blade shank 30 and affixed in place by conventional means such as, for example, by ultrasonic welding.

Figure 2:
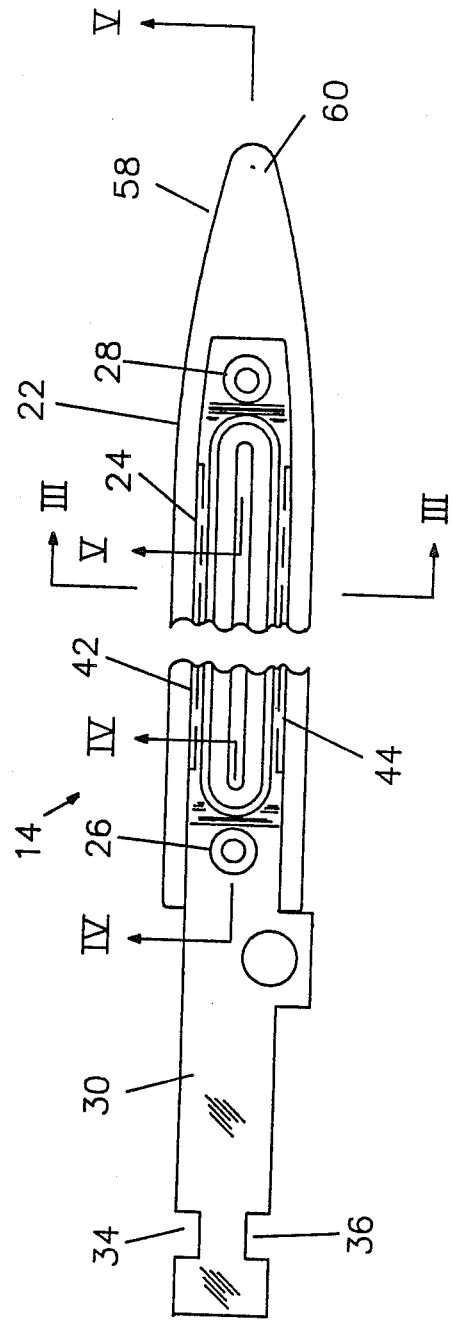
FIG. 2 is an enlarged view of the peeler of FIG. 1 detached from the electric knife an with the hand grip of FIG. 1 omitted for clarity.

Referring now to FIG. 2, wherein peeler attachment 14 is shown removed from electric knife 10 and without grip 32, blade shank 30 is seen to include first and second locking notches 34 and 36. As detailed in the referenced patent application, a clamping mechanism includes a clamping member resiliently urged into locking engagement with a locking notch in an edge of blade shank 30. By providing two locking notches 34 and 36, in opposed edges of blade shank 30, the locking mechanism is effective for locking peeler attachment 14 in one of two positions differing by a 180-degree rotation about a longitudinal axis of peeler attachment 14. In this manner, both right-handed and left-handed users are accommodated.

Figure 3:
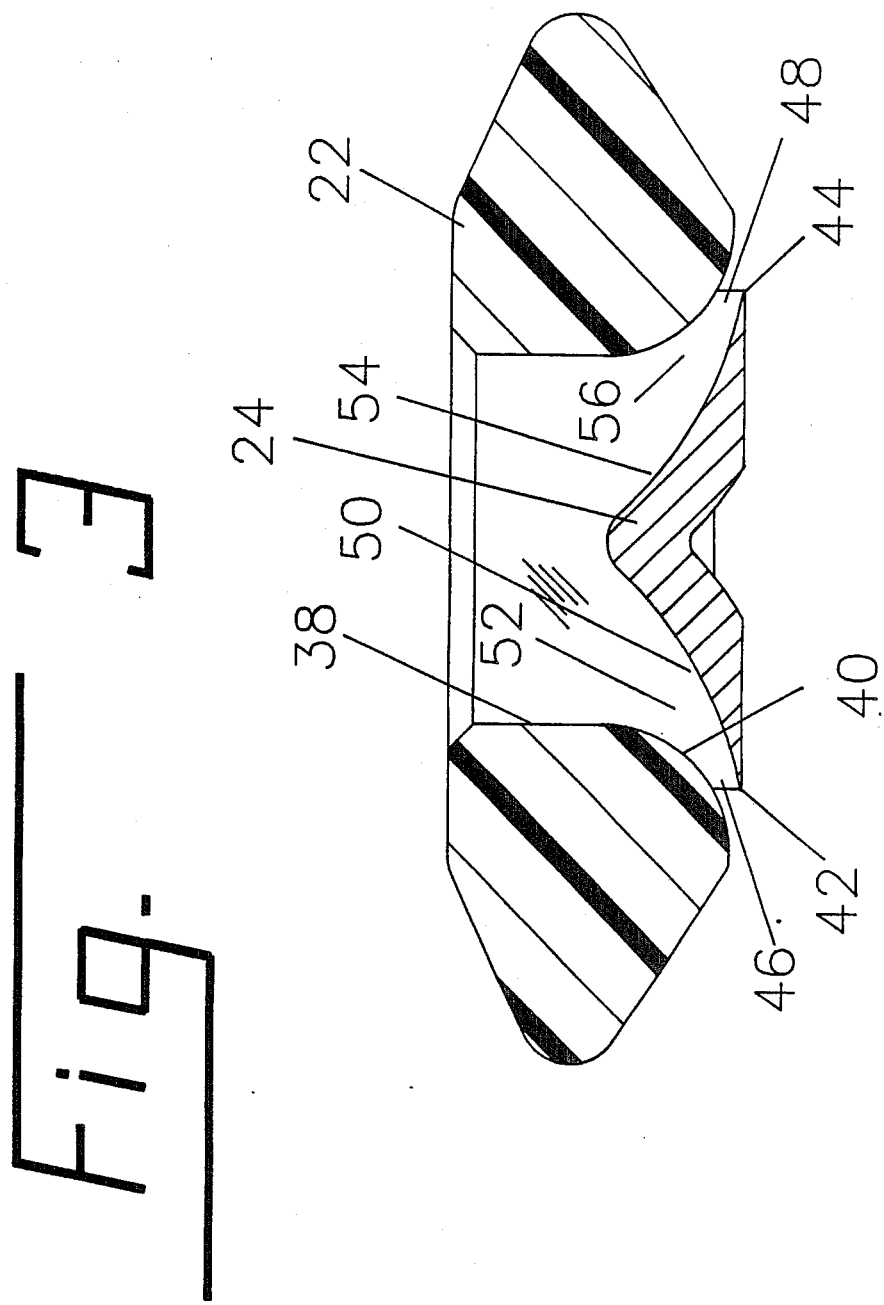
FIG. 3 is a cross section taken along III—III in FIG. 2.

Referring now to FIG. 3, peeler frame 22 includes a central slot 38 having a tapered opening 40. Blade 24 includes first and second cutting edges 42 and 44 disposed relative to tapered opening 40 to form entry channels 46 and 48, respectively. A surface 50 of blade 24 facing tapered opening 40 is shaped to form an exit channel 52 of continuously increasing cross section, whereby peelings sliced from an object by cutting edge 42 pass the smallest cross section at the instant of slicing and thereafter see continuously increasing cross section until finally discharged from tapered opening 40. Thus, any tendency for peelings to become wedged in exit channel 52 is avoided. Similarly, a surface 54 forms with a facing surface of tapered opening 40, an exit channel 56 having a continuously increasing cross section. In this manner, regardless of the one of cutting edges 42 and 44 used for removing a peel, easy self clearing of an exit channel is provided.

The thickness of peel removed is determined by the geometry of peeler frame 22 and blade 24. With electric knife 10 (FIG. 1) energized, peeler attachment 14 is capable of removing a peel from a soft fruit or vegetable without applying significant downward force. This is especially useful in peeling soft, pulpy items such as, for example tomatoes.

It will be noted that peeler frame 22 is shown lined for plastic resin and blade 24 is lined for metal. One embodoment of the invention employs a frame molded of a rigid plastic resin such as, for example, Nylon or a polycarbonate. In this embodiment, blade 24 is preferably steel. Plastic may be substituted for steel in blade 24. Other materials may be substituted without departing from the spirit and scope of the invention.

Referring again to FIG. 2, it will be noted that blade 24 and blade shank 30 are preferably formed of a unitary piece of metal. Blade 24 is formed by deforming the unitary piece of metal into the shape indicated in the cross section of FIG. 2 and grinding its edges to form cutting edges 42 and 44.

As also seen in FIG. 5, nose 58 on peeler frame 22 may be brought to a point 60 for permitting cutting out small objects such as, for example, eyes of potatoes. Alternatively, a forward end of blade 24 may be extended and shaped (in a manner not shown) to function as a point 60.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A peeler attachment for an electric knife comprising:
   a frame;
   a slot in said frame;
   a metallic blade affixed to said frame;
   a metallic shank extending from a first end of said peeler attachment;
   said metallic blade and said metallic shank being formed of a single piece of metal;
   said metallic shank including means for attaching said peeler attachment to said electric knife;
   said metallic blade including a shaped surface at least partly entering said slot;
   first and second sharpened edges on said metallic blade;
   said first and second sharpened edges being spaced from said frame to form first and second entry channels into said slot;
   said slot having a shape forming, with said shaped surface first and second exit channels contiguous with said first and second entry channels, respectively;
   said first entry channel and said first exit channel having a continuously increasing cross section;
   said second entry channel and said second exit channel forming a continuously increasing cross section, whereby a tendency for material to become wedged in said peeler attachment is avoided; and
   a nose on a second end of said frame, said nose having a point useable for digging out a portion of a fruit or vegetable.

2. A peeler attachment according to claim 1 wherein:

said means for attaching includes means for permitting attachment in a selectable one of first and second angular orientations with respect to said electric knife; and said first and second angular orientations being angularly spaced from each other 180 degrees about a longitudinal axis of said peeler attachment, whereby both right-handed and left-handed users are accommodated.

* * * * *